United States Patent
Ampoyo

(10) Patent No.: US 7,946,306 B2
(45) Date of Patent: May 24, 2011

(54) PORTABLE GARAGE

(76) Inventor: Geoffrey Ampoyo, Alexandria, VA (US)

( * ) Notice: Subject to any disclaimer, the term of this patent is extended or adjusted under 35 U.S.C. 154(b) by 0 days.

(21) Appl. No.: 11/844,570

(22) Filed: Aug. 24, 2007

(65) Prior Publication Data

US 2008/0053505 A1 Mar. 6, 2008

Related U.S. Application Data

(60) Provisional application No. 60/824,116, filed on Aug. 31, 2006.

(51) Int. Cl.
*E04H 15/06* (2006.01)

(52) U.S. Cl. .................................................... 135/88.06

(58) Field of Classification Search ............... 135/88.01, 135/88.05, 88.06; 224/42.26, 42.27, 42.28, 224/558; 248/229.1, 229.14, 229.23, 229.24, 248/229.13, 231.51

See application file for complete search history.

(56) References Cited

U.S. PATENT DOCUMENTS

| | | | |
|---|---|---|---|
| 2,477,051 A * | 7/1949 | Eisenhauer, Sr. | 152/225 R |
| 2,508,757 A | 5/1950 | Gray | |
| 3,036,583 A | 5/1962 | Miller | |
| 4,529,023 A * | 7/1985 | Deland | 152/225 R |
| 4,605,030 A | 8/1986 | Johnson | |
| 4,655,236 A | 4/1987 | Dorame et al. | |
| 4,667,692 A | 5/1987 | Tury et al. | |
| 4,944,321 A | 7/1990 | Moyet-Ortiz | |
| 5,241,977 A * | 9/1993 | Flores et al. | 135/88.06 |
| D362,729 S | 9/1995 | Kitchel | |
| 5,558,261 A * | 9/1996 | Hedeen | 224/511 |
| 5,575,300 A | 11/1996 | James | |
| 5,579,796 A * | 12/1996 | Mallo et al. | 135/88.06 |
| D403,782 S | 1/1999 | James | |
| 5,857,477 A | 1/1999 | James | |
| 5,918,613 A | 7/1999 | Larson | |
| 5,954,076 A | 9/1999 | McGinnis | |
| 6,035,874 A * | 3/2000 | Po-Chang | 135/88.06 |
| 6,394,118 B1 * | 5/2002 | Cikanowick et al. | 135/88.06 |
| 6,402,220 B2 | 6/2002 | Allen | |
| 6,988,505 B2 | 1/2006 | Powell et al. | |
| 2004/0040590 A1 | 3/2004 | Powell et al. | |

FOREIGN PATENT DOCUMENTS

| | | |
|---|---|---|
| WO | WO 91/18164 | 11/1991 |
| WO | WO 96/13645 | 5/1996 |

* cited by examiner

*Primary Examiner* — David Dunn
*Assistant Examiner* — Noah Chandler Hawk
(74) *Attorney, Agent, or Firm* — Shlesinger, Arkwright & Garvey LLP

(57) ABSTRACT

A portable shelter that attaches to the outsides of the tires of the vehicle, as opposed to the body or wheel hubs of the vehicle. The shelter includes a canopy attached to an upper end of at least one mast, and a mast base that is attached to a lower end of the mast. The mast base comprises a threaded bolt, a plate having a threaded opening for receiving the bolt therethrough, and a holder for receiving a lower end of the bolt. The base also includes a plurality of arms that each have a first end attached to the holder and a second end attached to a hook. Braces are mounted between the plate and the arms so that when the bolt moves relative to the plate, the arms move relative to the holder so that the hooks on the arms can receive the outsides of a tire.

12 Claims, 4 Drawing Sheets

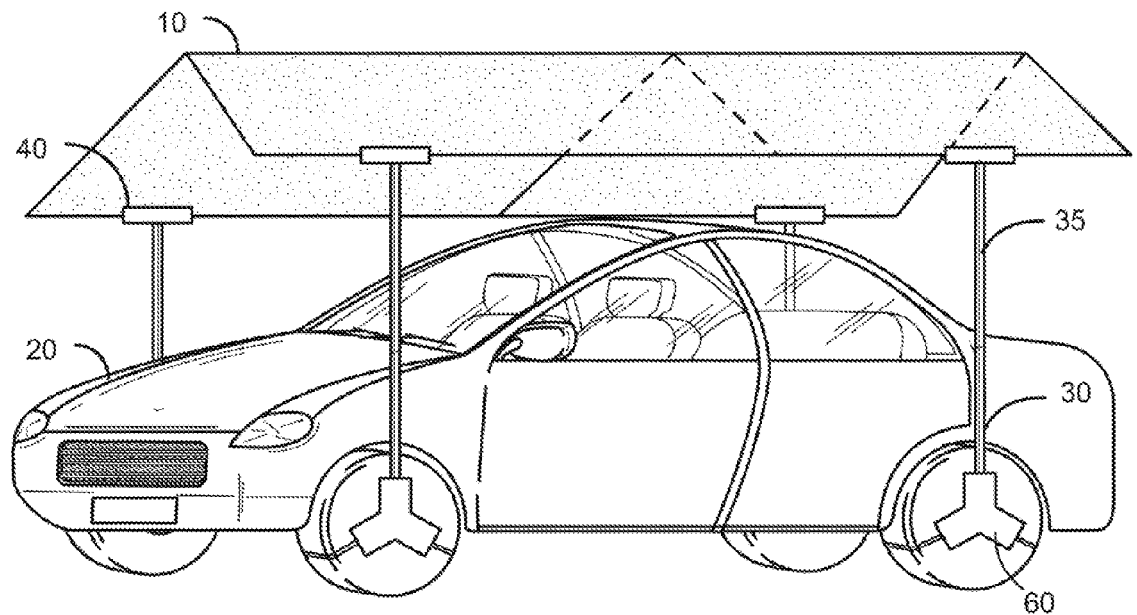
FIG. 1
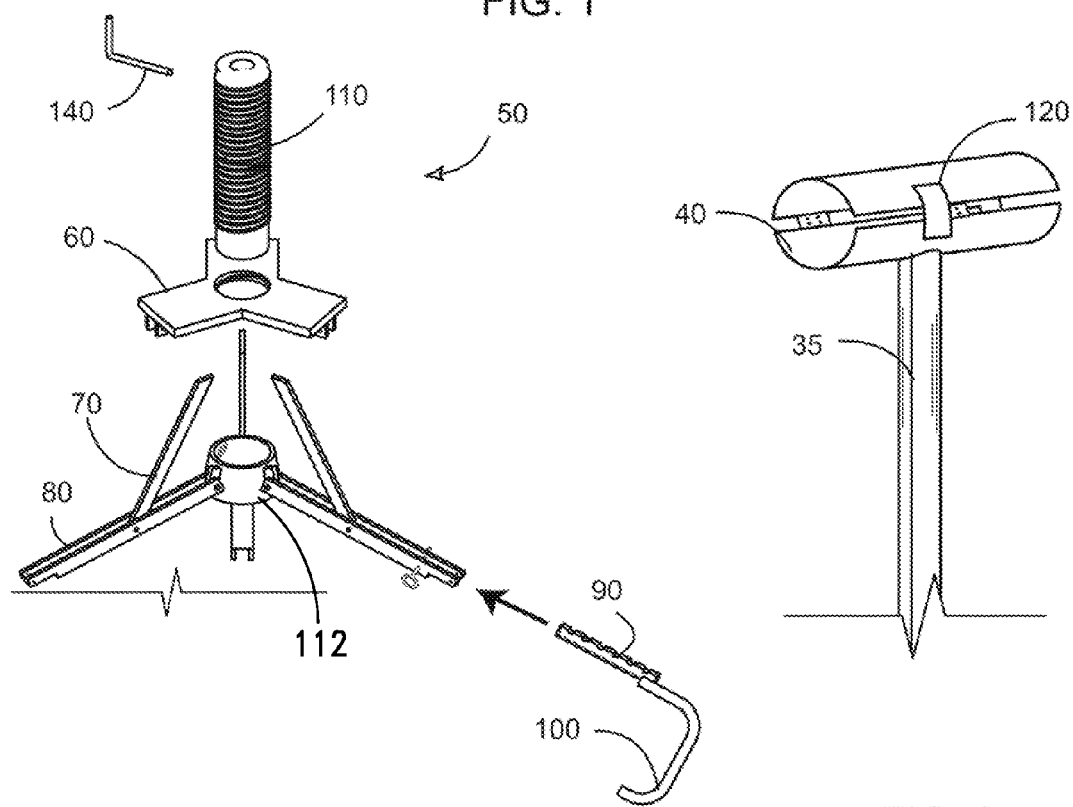
FIG. 2
FIG. 3

PORTABLE GARAGE

CROSS-REFERENCE TO RELATED APPLICATIONS

This application claims priority to U.S. provisional patent application No. 60/824,116 to Geoffrey Ampoyo filed on Aug. 31, 2006, entitled "Portable Garage," the subject matter of which is herein incorporated by reference in its entirety.

BACKGROUND OF THE INVENTION

1. Field of the Invention

The present invention is directed to a portable shelter for covering a vehicle. More specifically, the present invention involves a portable garage that attaches to the outsides of a vehicle's tires so that the garage does not damage the body of the vehicle or the wheel hubs.

2. Brief Description of the Prior Art

One of the most desired aspects of owning an automobile is having your own garage. People tend to park under a shade of a tree or a shade of a tall building during hot sunny weather to avoid going inside an automobile with an oven-like temperature after parking for a few hours. Also, during winter, people without garages do not have a choice but to park outdoors and expose their vehicles to the elements. These individuals have to hope that when hail occurs, it does not damage their automobiles.

Portable shelters for automobiles are well known and have been around for some time, such as the U.S. Pat. No. 4,655,236 to Dorame et al., U.S. Pat. No. 6,988,505 to Powell et al., and U.S. Pat. No. 5,575,300 to James. These devices use the ground or the center of a wheel hub for support. As a result, the prior art shelters can mar or otherwise damage a vehicle. Thus, there is a need for a portable shelter that does not come in contact with a vehicle's surface or wheel hub.

SUMMARY OF THE INVENTION

The present invention is directed to a portable shelter for a vehicle that attaches to the outsides of the vehicle's tires so that the shelter does not contact and damage the vehicle's body surface or wheel hubs. The shelter includes a canopy attached to an upper end of at least one mast, and a mast base that is attached to a lower end of the mast. The mast base comprises a threaded bolt, a plate having a threaded center opening for receiving said bolt therethrough, and a holder for receiving a lower end of said bolt. The base also includes a plurality of arms that each have a first end attached to the holder and a second end attached to a hook that is adapted to receive an outside of a tire. Braces are mounted between the plate and the arms so that when the bolt moves relative to the plate, the arms move relative to the holder so that the hooks on the arms can receive the outsides of a tire.

It is an object of the invention to provide an automobile shelter that can be easily assembled and to fit a variety of automobile sizes.

Another object of the invention is to provide a portable automobile shelter with a telescoping vertical support mast attached to a clamping mechanism that grips the outsides of a vehicle tire.

Still another object of the invention is to provide an automobile shelter that can be adjusted to a vehicle's height and also independently adjustable mast for protection against the weather.

Still another object of the invention is to provide an automobile shelter that does not come into contact with a vehicle body.

Another object of the invention is to provide an automobile shelter having a flexible fabric cover with a frame secured by a latch to the masts.

These advantages and other features of the invention will become apparent upon studying the illustrations and descriptions of the embodiment of the invention.

BRIEF DESCRIPTION OF THE DRAWINGS

A better understanding of the invention will be had with respect to the accompanying drawings wherein:

FIG. 1 is a right side perspective view of a portable garage in accordance with the present invention;

FIG. 2 is a perspective view of a mast-clamping base of the invention;

FIG. 3 is a perspective view of a U-shaped element of the invention;

DETAILED DESCRIPTION OF THE PREFERRED EMBODIMENT

Figure 4:
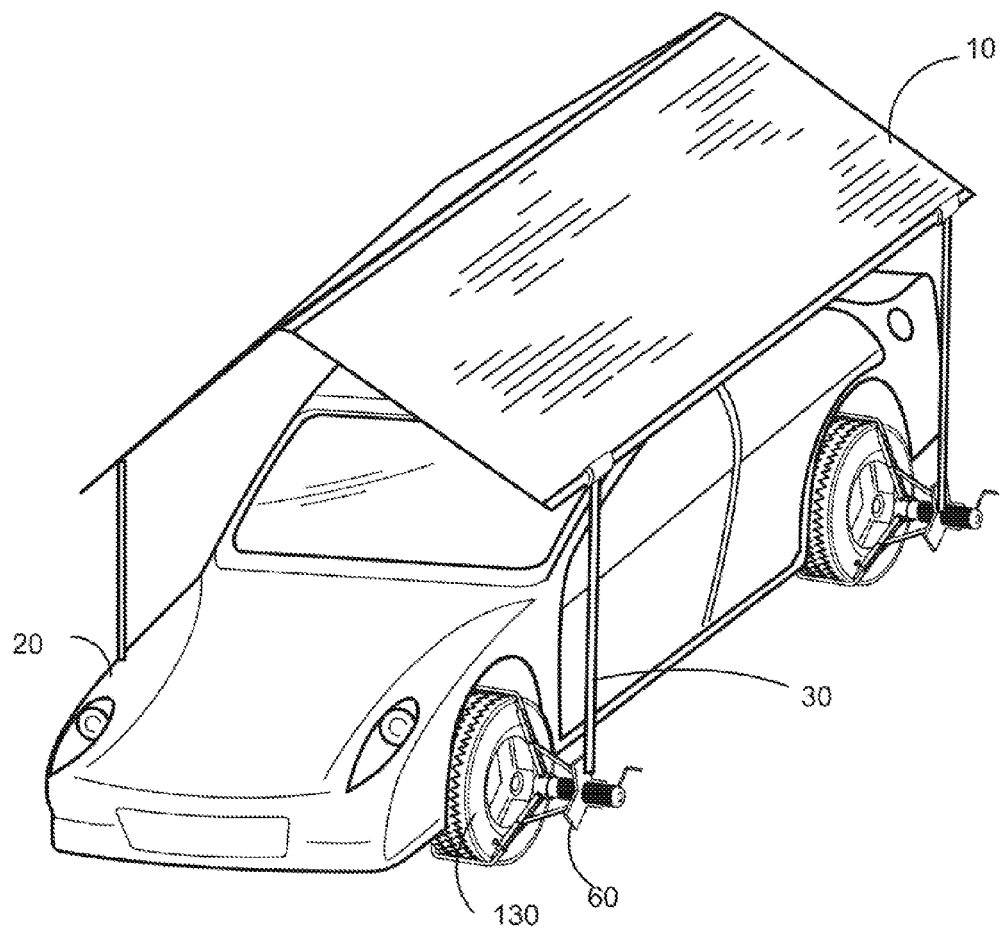
FIG. 4 is a front perspective view of an automobile sheltered by the portable shelter of the present invention.
Figure 5:
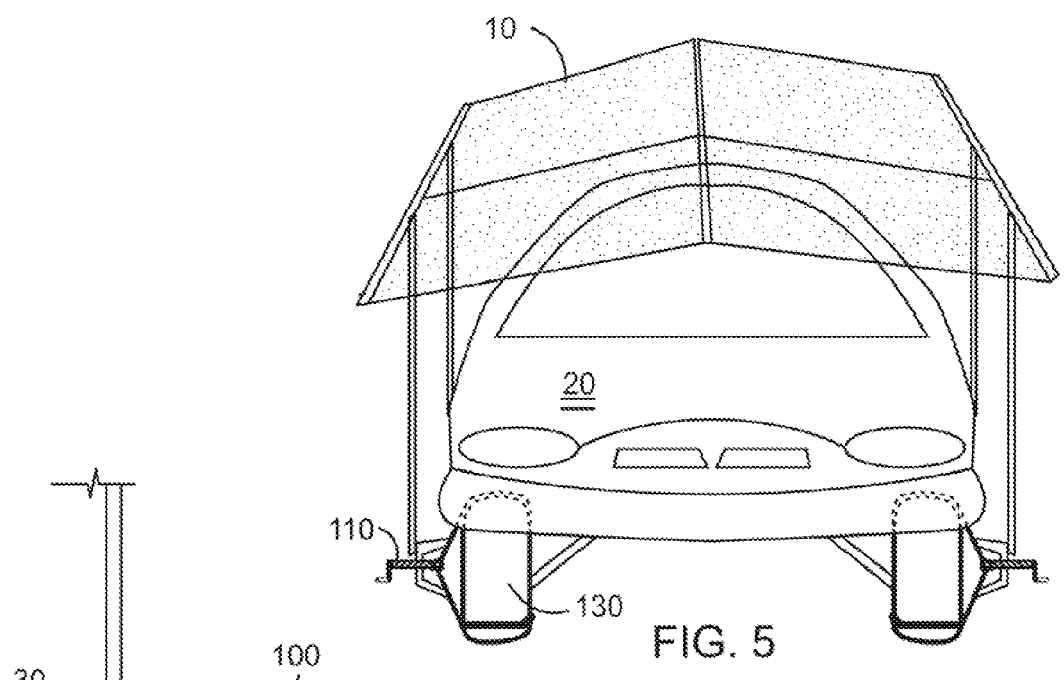
FIG. 5 is a front plan view of the sheltered automobile of FIG. 4.

As shown in FIGS., 1, 4, and 5, a portable canopy 10 is attached to a U-shaped element 40 of an inner tubing mast 35. The U-shaped element 40 serves as a clamping means so that the canopy frame 10 may be moved within the slot of the U-shaped element 40 to adjust the position of the canopy 10 relative to an automobile 20 to assure exact coverage of the automobile 20.

The canopy frame 10 is preferably a rectangular shape that is bent into an inverted V-shape. The frame 10 consists of adjustable interconnected tubes and three sub frame components 32, 33, and 34. The interconnected tubes 31 are connected to each other by a threaded bolt on one end of each tube and a threaded nut on the other end of each tube. Alternatively, the interconnected tubes are telescoping tubes. Each of the three sub frame components 32, 33 and 34 are connected by fitting means, such as a T-fitting and L-fittings. A canopy fabric covers the entire frame 10, and the fabric is secured to the frame 10 by securing means, such as tie downs or Velcro®. The canopy fabric can be replaced with a flexible screen type fabric for use on high wind areas.

FIG. 3 shows the U-shaped element 40 having a latch 120 and hinges to clamp and lock the canopy frame 10. The inner tubing mast 35 is attached to the U-shaped element 40. The inner tubing mast 35 slides inside an outer tubing mast 30 to adjust the height of the canopy 10. To adjust height of the canopy 10, cotter pins are placed in aligned holes (not shown) of the outer and inner masts 35 and 30, respectively, to lock the outer and inner masts 35 and 30 in place relative to each other. In an alternative embodiment, the outer tubing mast 30 is replaced by a height adjustable extension mast (not shown) that can be planted on the ground and reinforced with ropes and stakes to be used as a stand-alone shelter or garage.

The outer tubing mast 30 is attached to a triangular metal plate 60 of a mast clamping base 50. As shown in FIG. 2, the outer tubing mast 30 is secured to the triangular plate 60 via threads in the center of the triangular plate 60. In an alternative embodiment, the plate 60 can have more or less than three clamping arms.

FIG. 2 shows the mast clamping base 50. A turning handle 140 is attached at an upper end of a threaded bolt 110, which screws into the triangular metal plate 60 having threads in the center. A lower end of the bolt 110 mounts to a stationary circular metal holder 112 so that the bolt 110 is able to rotate freely within the circular metal holder. In an alternative embodiment, the upper end of the bolt 110 is mounted to an unthreaded triangular metal plate 60 so that the bolt 110 is free to rotate relative to the triangular plate 60 as the lower end of the bolt is screwed into a threaded circular metal holder.

The circular metal holder has three equally spaced tabs that each receives an arm 80. The arms 80 are U-shaped in cross-section. In an alternative embodiment, the circular metal holder 112 can have more or less than three tabs and corresponding arms 80.

An upper end of a rectangular metal brace 70 is pivotally mounted to a lower edge of the triangular metal plate 60, and a lower end of the brace 70 is pivotally mounted to a U-shaped arm 80. As the bolt 110 is screwed into or out of the triangular metal plate 60, the in-and-out motion of the bolt 110 relative the triangular metal plate 60 causes the upper end of the rectangular metal piece 70 to pivot about the connection to triangular metal piece 60 and the lower end of the rectangular metal piece 70 to pivot about the connection to the U-shaped arm 80. The pivoting movement of the rectangular metal piece 70 causes the U-shaped arm 80 to either extend outwardly from the circular metal holder 112 or to move inwardly toward the circular metal holder 112.

Figure 6:
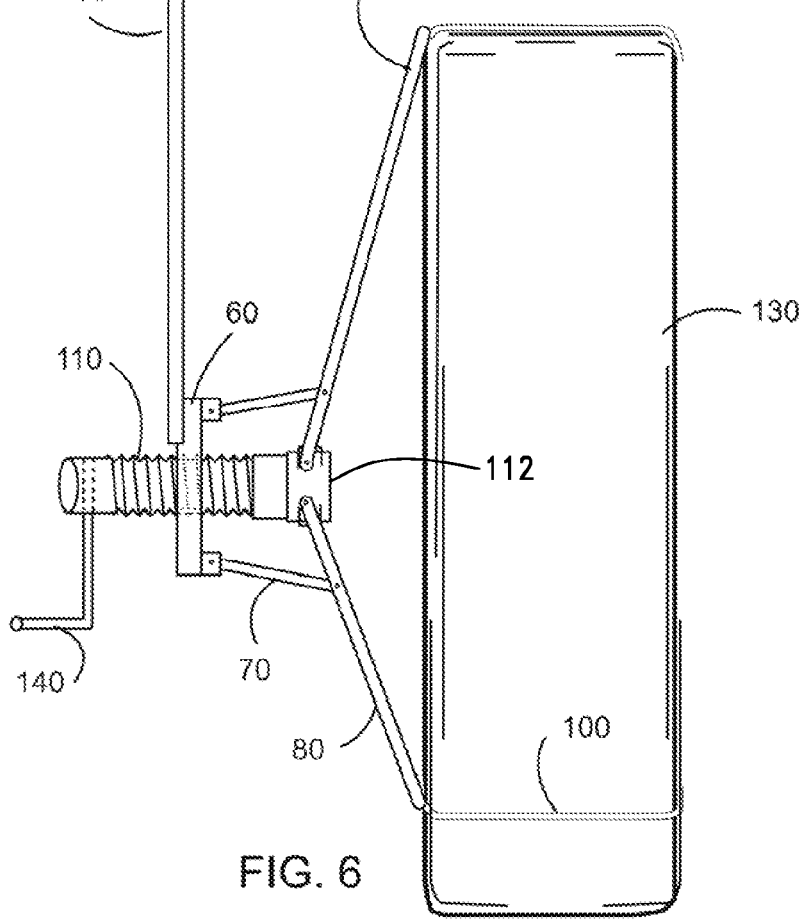
FIG. 6 is a front plan view of the mast clamping mechanism attached to a tire.
Figure 7:
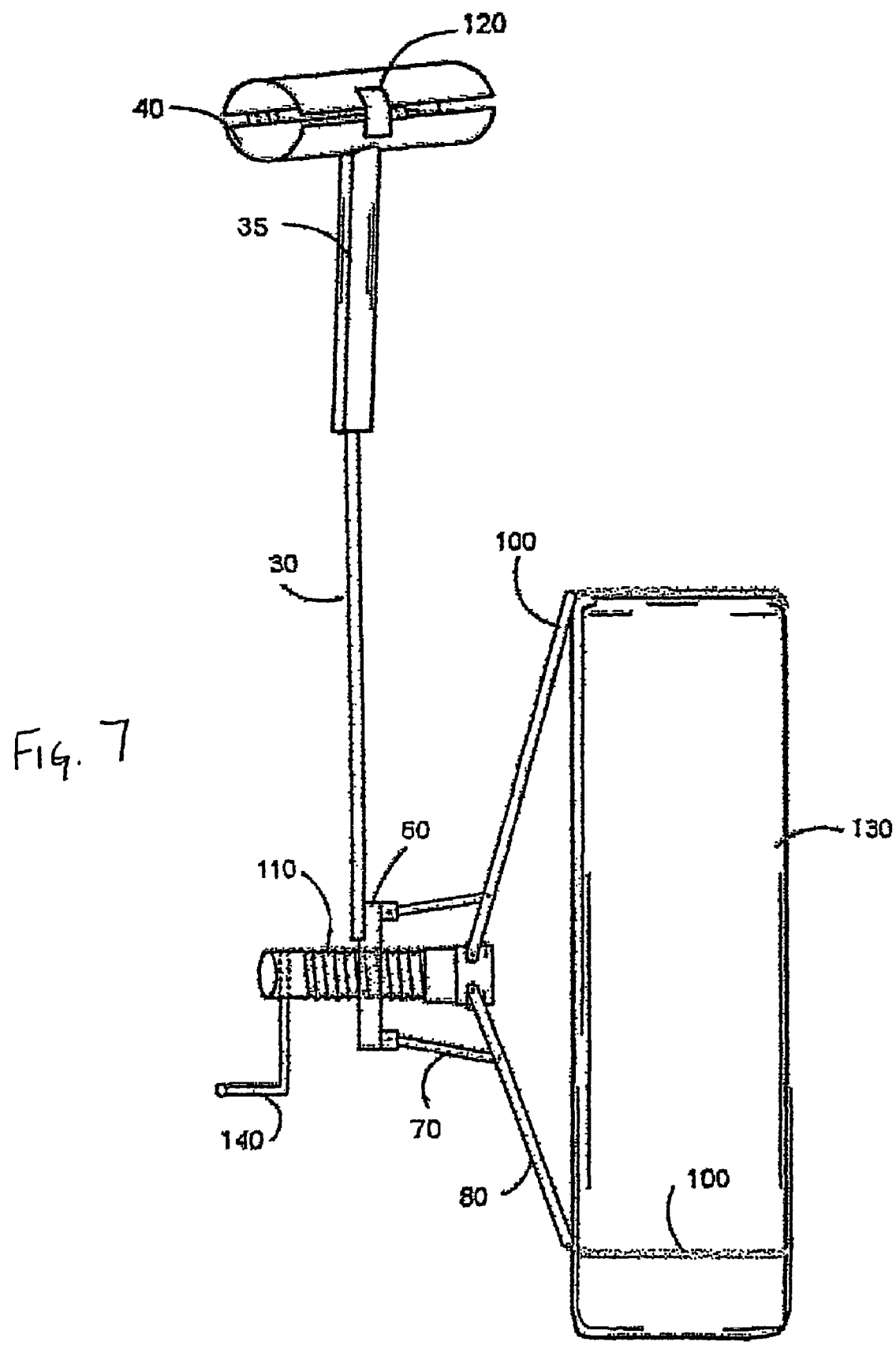
FIG. 7 is a front perspective view showing the inner tubing received within the outer tubing of the mast of the present invention.

A sliding rectangular metal piece 90 slides within the slot of each of the U-shaped arms 80. A hooking means 100 is attached to a lower end of the sliding piece 90, and the hooking means 100 is designed to attach to an outside of a tire. In the preferred embodiment, the hooking means 100 is a U-shaped hook 100. A bolt (not shown) is threaded through the U-shaped hook 100 at the lower end of the sliding rectangular metal piece 90 with a flat rectangular metal strip mounted at the lower end of the sliding piece 90. The bolt can be screwed in or out to allow adjustment for a variety of tire widths. A pin locks the sliding piece 90 in place relative to an arm 80 so that the mast clamping base 50 can be sized to accommodate a variety of tire sizes. FIG. 6 shows a close up view of a mast clamping mechanism attached to a tire 130.

In sum, turning the handle 140 clockwise or counterclockwise causes the bolt 110 to move in or out the triangular metal plate 60 which in turn push or pull the rectangular metal brace 70. The push or pull action of the rectangular metal brace 70 causes the U-shaped arm 80 to move outwardly or inwardly so that the U-shaped hook 100 can be secured to the outside of the automobile tire 130.

While the present invention has been described in terms of specific embodiments, it is to be understood that the invention is not limited to these disclosed embodiments. This invention may be embodied in many different forms and should not be construed as limited to the embodiments set forth herein; rather, these embodiments are provided by way of illustration only and so that this disclosure will be thorough, complete and will fully convey the full scope of the invention to those skilled in the art. Indeed, many modifications and other embodiments of the invention will come to mind of those skilled in the art to which this invention pertains, and which are intended to be and are covered by both this disclosure, the drawings and the claims.

What is claimed is:

1. A portable shelter for sheltering a vehicle, comprising:
   a) a canopy for sheltering the vehicle;
   b) a plurality of masts each having a first end secured to said canopy;
   c) a plurality of mast bases each secured to a respective second end of said masts;
   d) said mast bases each including a plurality of hooks that attach to an outside of a tire of the vehicle, a bolt having an outer end and an inner end, a plate having a threaded opening for threadedly receiving said bolt therethrough, a holder for rotatably receiving therein said inner end of said bolt, a plurality of arms each having a first end attached to said holder and a second end attached to a respective one of said hooks, and a plurality of braces each having a first end pivotally connected to said plate and a second end pivotally connected to a respective one of said arms;
   e) said holder of each of said mast bases is spaced from the tire when said mast bases are secured to the tire;
   f) said plate is movable toward said holder when said bolt is turned one way to cause each of said braces to push a respective one of said arms and cause said first end of each of said arms and said holder to move away from the tire, whereby said hooks are secured to the tire; and
   g) said plate is movable away from said holder when said bolt is turned another way to cause each of said braces to pull a respective one of said arms and cause said first end of each of said arms and said holder to move toward the tire, whereby said hooks are loosened from the tire.

2. A portable shelter as in claim 1, wherein said canopy includes a frame bent into an inverted V-shape.

3. A portable shelter as in claim 2, wherein said canopy includes a fabric attached to said frame.

4. A portable shelter as in claim 3, where said frame includes interconnected tubes.

5. A portable shelter as in claim 1, wherein each second end of said masts includes a clamp for attaching to said canopy.

6. A portable shelter as in claim 5, wherein said clamp includes an U-shaped element.

7. A portable shelter as in claim 1, wherein said arms are U-shaped in cross-section.

8. A portable shelter as in claim 1, wherein each of said hooks includes a member adjustably attached to each of said arms.

9. A portable shelter as in claim 1, wherein:
   a) said arms each includes a U-shaped cross-section; and
   b) each of said hooks includes a member disposed within said U-shaped cross-section.

10. A portable shelter as in claim 1, and further comprising a handle attached to said outer end of said bolt for turning said bolt.

11. A portable shelter as in claim 1, wherein each of said masts includes an inner tubing disposed within an outer tubing.

12. A method of sheltering a vehicle, comprising:
   a) providing a plurality of mast bases, each mast base including a plurality of hooks that attach to an outside of a tire of the vehicle, a bolt having an outer end and an inner end, a plate having a threaded opening for threadedly receiving said bolt therethrough, a holder for rotatably receiving said inner end of said bolt therein, a plurality of arms each having a first end attached to said holder and a second end attached to a respective one of said hooks, and a plurality of braces each having a first end pivotally connected to said plate and a second end pivotally connected to a respective one of said arms;

b) for each of said mast bases, attaching said hooks to an outside of a respective tire of the vehicle, turning said bolt one way to move said plate toward said holder to cause each of said braces to push a respective one of said arms and cause said first end of each of said arms and said holder to move away from the tire, whereby said hooks are secured to the tire;

c) providing a plurality of masts each having a first end and a second end;

d) for each mast, securing said mast first end to a respective one of said mast bases; and e) securing a canopy to said second end of each of said masts.

* * * * *